(12) United States Patent
Arambepola et al.

(10) Patent No.: US 7,970,068 B2
(45) Date of Patent: *Jun. 28, 2011

(54) MOBILE CHANNEL ESTIMATION FOR DBV-T COFDM DEMODULATOR

(75) Inventors: Bernard Arambepola, Enfield (GB); Thushara Hewavithana, Borchamwood (GB); Parveen K. Shukla, Nottingham (GB)

(73) Assignee: Intel Corporation, Santa Clara, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 11/986,897

(22) Filed: Nov. 27, 2007

(65) Prior Publication Data

US 2009/0135923 A1     May 28, 2009

(51) Int. Cl.
*H04K 1/10* (2006.01)
*H04L 27/28* (2006.01)

(52) U.S. Cl. ........ 375/260; 375/346; 375/349; 375/231; 370/208; 455/63.1; 455/570

(58) Field of Classification Search ............... 375/260, 375/346, 349, 350, 229–231; 370/208; 455/63.1, 455/570
See application file for complete search history.

(56) References Cited

U.S. PATENT DOCUMENTS 7,801,020 B2 *   9/2010   Shukla et al. ................. 370/208
* cited by examiner

*Primary Examiner* — Phuong Phu
(74) *Attorney, Agent, or Firm* — Thorpe North & Western LLP

(57) ABSTRACT

A channel estimator for use in a DVB-T system is capable of high Doppler performance without incurring restrictive delay spread limitations, in a hardware efficient manner. A first channel impulse response is generated that has ambiguity due to under-sampling in the frequency domain. A filter is then used to filter scattered pilots to generate a mask that is capable of resolving the ambiguities. In at least one approach, a finite impulse response filter is used during the mask generation process to generate a snapshot of the channel frequency response in non-real time. In another approach, an infinite impulse response filter is used during the mask generation process to generate a channel frequency response in real time.

20 Claims, 8 Drawing Sheets

US 7,970,068 B2

MOBILE CHANNEL ESTIMATION FOR DBV-T COFDM DEMODULATOR

TECHNICAL FIELD

The invention relates generally to wireless communications and, more particularly, to channel estimation techniques for use in multicarrier wireless systems.

BACKGROUND OF THE INVENTION

DVB-T (Terrestrial Digital Video Broadcasting) is the digital terrestrial television standard adopted by Europe and many other countries. A very important operation in a mobile DVB-T digital terrestrial television demodulator is the estimation of the time-varying channel. If this can be done accurately, then other functions like equalization and inter-carrier-interference cancellation are made simpler.

The conventional method for achieving high Doppler performance for mobile DVB-T is time filtering. In this method, a filter/interpolator is applied in the time dimension on scattered pilots. In a conventional DVB-T implementation, the scattered pilots repeat every four orthogonal frequency division multiplexing (OFDM) symbols. Nyquist sampling theory imposes a theoretical limit on the maximum achievable Doppler performance using time filtering. For example, if the OFDM symbol period is $T_u$ and the guard interval is $T_g$, then the scattered pilot spacing in time is $4(T_u+T_g)$. Therefore, the Doppler limit is $0.125/(T_g+T_u)$ Hertz (Hz). For 8 megaHertz (MHz) 8K OFDM with a guard ratio of ¼, the value of $T_u$ is 896 microseconds (µs), which results in a Doppler limit of 111.5 Hz (for the corresponding 6 MHz version, the limit is 83.5 Hz). In practice, it is very difficult to get close to this theoretical limit because of the sharpness required of the filter. To achieve a sharp filter many filter taps are required. The memory cost of a single tap in the filter is four OFDM symbols and each 8K symbol contains 6817 complex samples. Thus, the hardware cost of such an approach is high.

The Doppler frequency at velocity V is equal to $F_c*(V/C)$, where $F_c$ is the carrier frequency and C is the speed of light. A vehicle traveling at 80 miles per hour (mph) will generate a Doppler frequency of 117 Hz at the top end of the UHF band. Hence, the limits mentioned in the preceding paragraph will be exceeded by fast moving cars and certainly by trains. In addition, the Doppler frequency will be much higher for L band applications. The above theoretical limits can be exceeded if the delay spread of the echo profile (i.e., the length of the channel impulse response) is small. Then, the channel can be estimated using the scattered pilots in each symbol without the need for time filtering. However, the scattered pilots in each OFDM symbol are spaced every $12/T_u$ Hz. Therefore, the length of the impulse response will be limited to $T_u/12$ when deriving the channel response from each OFDM symbol. This is inconsistent with the fact that many DVB-T Single Frequency Networks (SFNs) have been designed with guard ratios of $T_u/8$ and $T_u/4$ to allow for longer delay spreads. There is a need for methods and structures that are capable of achieving high Doppler performance when estimating a time-varying channel in a DVB-T system without such delay spread limitations.

DETAILED DESCRIPTION

Figure 1:
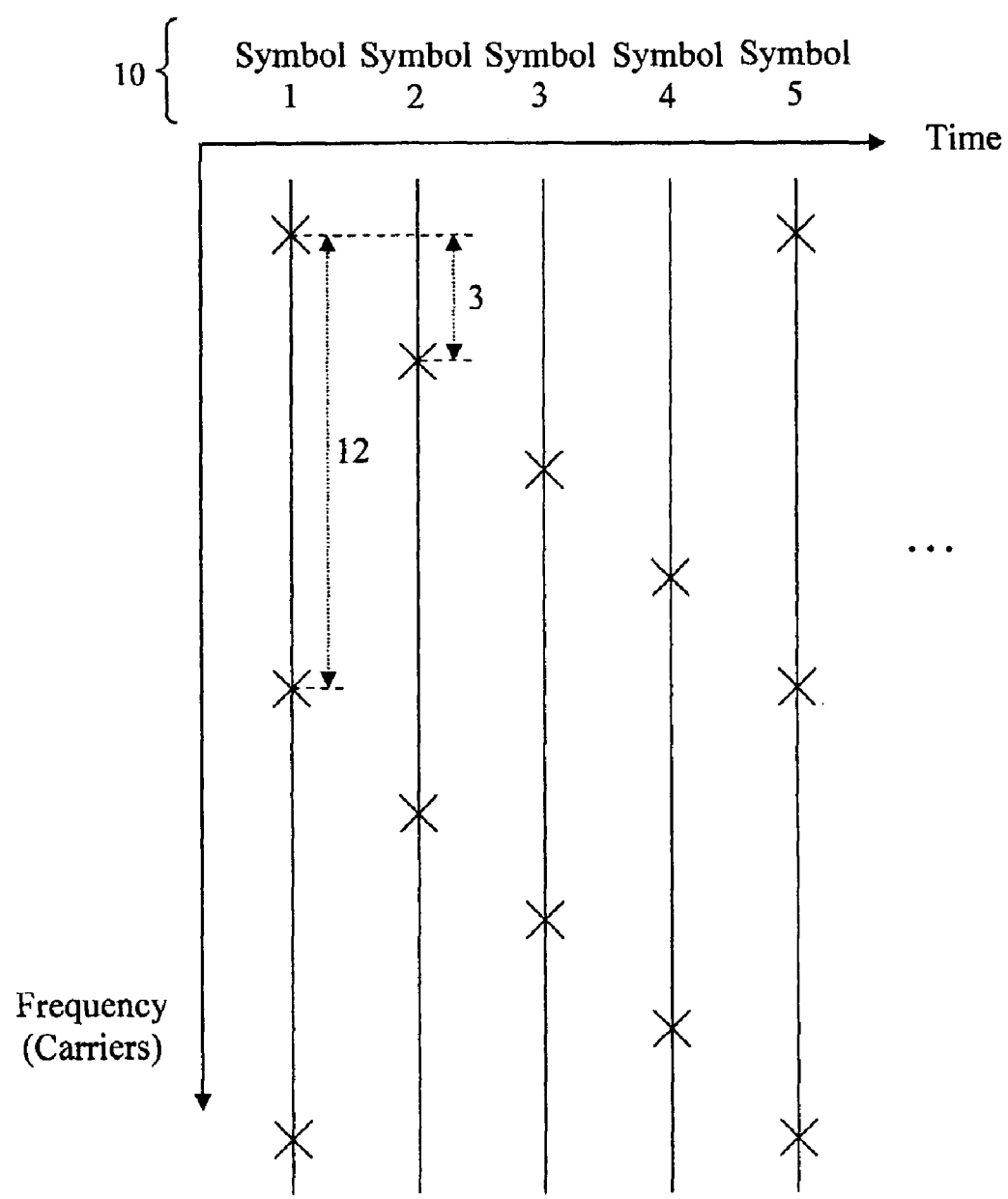
FIG. 1 is a timing diagram illustrating the arrangement of scattered pilots within a progression of OFDM symbols in a typical DVB-T based system.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

DVB-T uses two types of pilot tones: continuous pilots and scattered pilots. Continuous pilots are somewhat randomly distributed and occur at the same frequency in each OFDM symbol. Scattered pilots are more structured. The techniques of the present invention use the scattered pilots. FIG. 1 is a timing diagram illustrating the arrangement of scattered pilots within a progression of OFDM symbols 10 in a typical DVB-T based system. The scattered pilots are represented as X's within each OFDM symbol in FIG. 1. The vertical axis in FIG. 1 is the frequency (or carrier) axis. As shown, the scattered pilots within each OFDM symbol are spaced 12 carriers apart. In addition, in each successive OFDM symbol, the scattered pilots shift in frequency by 3 carriers. Thus, after 4 OFDM symbols, the original scattered pilot pattern repeats (e.g., symbol 1 and symbol 5 in FIG. 1 have the same scattered pilot arrangement). As described previously, the symbol period may be defined as $T_u$. The carrier separation is thus $1/T_u$ and the scattered pilots within each symbol are spaced at $12/T_u$ in frequency. It should be appreciated that FIG. 1 is only showing a portion of each of the illustrated OFDM symbols. That is, the symbols normally include a much higher number of scattered pilots.

In general, good Doppler performance can be obtained by using only the scattered pilots of each symbol for channel estimation. However, because the scattered pilots are $12/T_u$ apart in the frequency domain, the maximum achievable delay spread in the time domain would be $T_u/12$. The technique would thus fail when echoes in the transmission medium are more than $T_u/12$ seconds apart. Many of the Single Frequency Network applications that are planned for DVB-T, or that already exist, will require delay spreads greater than $T_u/12$. One technique that may be used to maximize delay spread is to time filter and interpolate the scattered pilots. Using this technique, a filter/interpolator may be applied along each frequency bin that includes scattered pilots to give channel estimates at the three intermediate points (along time) between successive scattered pilots. This results in channel estimates at a spacing of $3/T_u$ in the frequency dimension and hence extends the maximum delay spread of the echo profile to $T_u/3$. However, this technique requires a significant amount of extra memory and imposes serious constraints on the maximum achievable Doppler frequency. The memory increase is due to the relatively large number of taps required in the time filter. One tap in the time filter requires four symbols worth of memory because scattered pilots in each corresponding frequency bin are four OFDM symbols apart. In addition, it is necessary to store data (in addition to pilots) to compensate for the non-causal segment of the FIR filter (which is 50%). The constraint on maximum Doppler frequency achievable by time filtering is set by the Nyquist sampling theorem. Since scattered pilots are separated in the time dimension by $4 \times (T_u+T_g)$, the Doppler frequency range is $\pm 0.5/(4*(T_u+T_g))$. In practice, it is difficult to get close to this limit due to the complexity of the required time filter.

The present invention relates to techniques for estimating a time-varying channel in a DVB-T system that do not require the large memories necessary to implement time filtering approaches. The techniques are not limited by the maximum theoretical Doppler frequencies described above (e.g., 0.125/$(T_u+T_g)$). That is, the techniques are capable of operating at higher Doppler frequencies and with delay spreads in excess of $T_u/12$. The techniques are not capable of providing high Doppler for every potential echo profile with delay spreads in excess of $T_u/12$, but can provide good Doppler performance for most practical echo profiles in this range. The techniques will work for all echo profiles with delay spreads less than $T_u/12$. The techniques can be implemented with relatively low hardware complexity. In at least one embodiment, a communication device will first test whether an echo profile is such that the inventive techniques may be used to estimate the channel. If not, an alternative channel estimation technique may be used (e.g., a technique with more limited Doppler performance).

Figure 2:
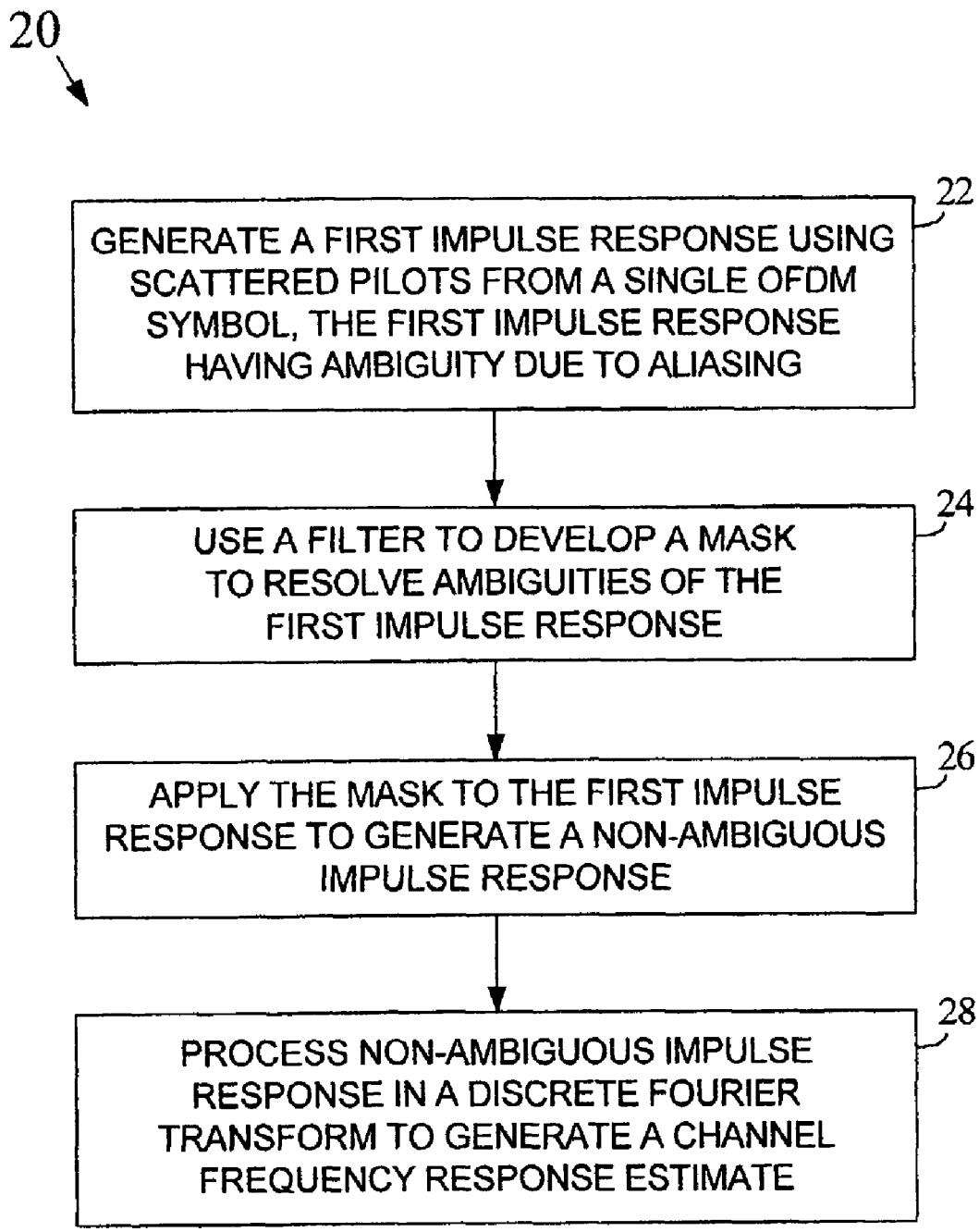
FIG. 2 is a flowchart illustrating an example method for estimating a channel response in a DVB-T system in accordance with an embodiment of the present invention.

FIG. 2 is a flowchart illustrating an example method 20 for estimating a channel response in a DVB-T system in accordance with an embodiment of the present invention. A first impulse response is generated by performing an inverse fast Fourier transform (IFFT) using scattered pilots from a single OFDM symbol (block 22). Because the scattered pilots within a symbol are $12/T_u$ apart, the IFFT will only cover a time period of $T_u/12$. Any echoes outside of this period will be aliased back into the time interval $T_u/12$. This is basically time domain impulse response aliasing due to undersampling in the frequency domain. Because of this aliasing, the first impulse response will have ambiguities as it will not be known whether the contents of the response are true or aliased. A filter is also used to operate upon the scattered pilots to develop a mask for use in resolving the ambiguities in the first impulse response (block 24). This process may be performed after, or concurrent with, the generation of the first impulse response described above. As will be described in greater detail, in one approach, a finite impulse response (FIR) filter is used to filter scattered pilots in non-real time. In another approach, an infinite impulse response (IIR) filter is used to filter scattered pilots in real time. The mask is next used to operate upon the first impulse response to generate a non-ambiguous impulse response (block 26). Before the mask is applied, the first impulse response may be replicated multiple times, in time. The non-ambiguous impulse response is then processed in a fast Fourier transform (or other discrete Fourier transform) to generate the final channel frequency response estimate (block 28).

Figure 3:
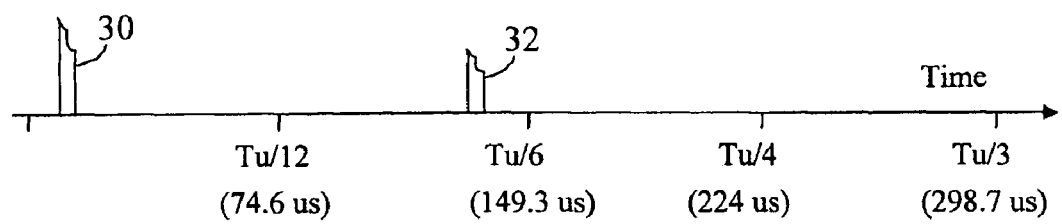
FIGS. 3, 4, 5, 6, and 7 are timing diagrams illustrating an example of the operation of the method of FIG. 2 in accordance with an embodiment of the present invention.

FIGS. 3, 4, 5, 6, and 7 are timing diagrams illustrating an example of the operation of the method 20 of FIG. 2 in accordance with an embodiment of the present invention. In a DVB-T single frequency network (SFN), multiple transmitters will typically transmit the same signal at different locations. FIG. 3 illustrates the actual echo profile at a receiver that is receiving signals from two different transmitters, one nearer the receiver (i.e., less than $T_u/12$ seconds away) and the other farther from the receiver (i.e., greater than $T_u/12$ seconds away). Each of the transmitted signals will give rise to reflections close to the receiver. It will be assumed that the set of reflections associated with each signal will take the form of a TU6 channel (i.e., the 6-path Typical Urban Rayleigh fading channel) which is widely used for mobile system modeling. The delay spread of the TU6 channel is approximately 5 µs.

Figure 4:
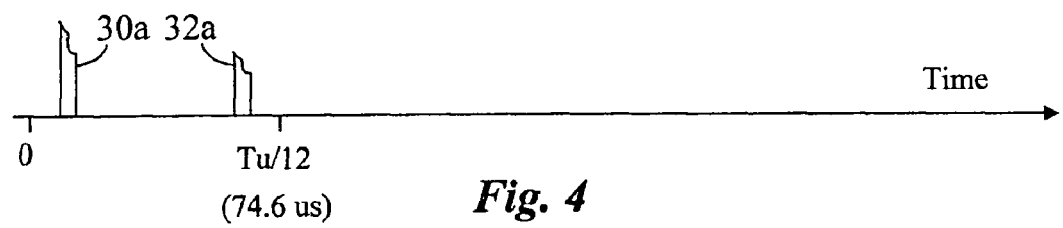
Figure 5:
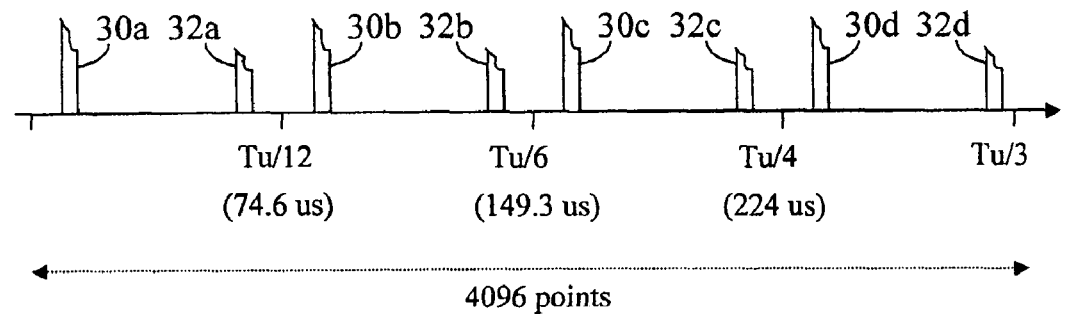

The signal from the nearer transmitter is represented in FIG. 3 as signal 30 and the signal from the farther transmitter is illustrated as signal 32. Because the signal 32 from the farther transmitter is received after $T_u/12$, it will be aliased into the $T_u/12$ interval when the IFFT of the scattered pilots is performed. This is illustrated in FIG. 4 where signal 30a corresponds to signal 30 of FIG. 3 and signal 32a corresponds to signal 32 of FIG. 3 (aliased into the $T_u/12$ interval). Before the mask is applied, the channel impulse response of FIG. 4 is replicated four times over time as illustrated in FIG. 5. The four replicas are shown in the channel impulse response of FIG. 5 as signals 30a and 32a between 0 and $T_u/12$; 30b and 32b between $T_u/12$ and $T_u/6$; 30c and 32c between $T_u/6$ and $T_u/4$; and 30d and 32d between $T_u/4$ and $T_u/3$.

Figure 6:
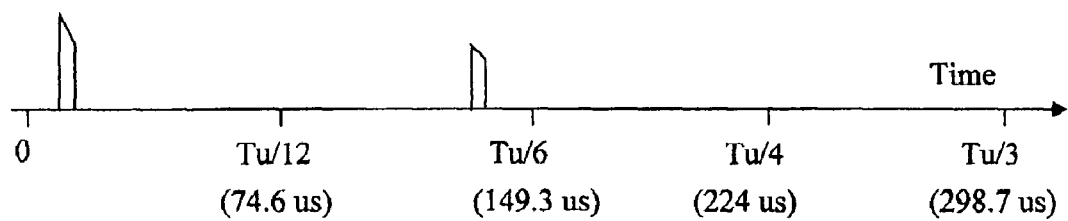
Figure 7:
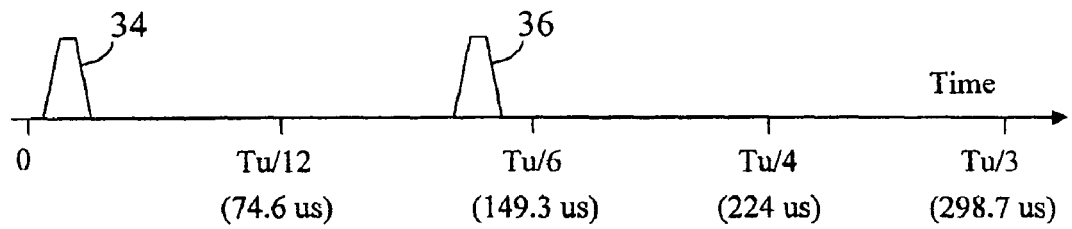

As described previously, the mask is generated by first applying the scattered pilots to a time filter (e.g., a FIR or IIR filter). The filtered signal may then be processed in an IFFT to generate an impulse response and the magnitudes of the resulting impulse response may be taken. The impulse response magnitudes are then applied to a recursive (decaying) averager to generate the envelope of the impulse response. FIG. 6 illustrates this envelope for the present example. Thresholding may be applied to generate the mask. Once the mask has been generated, the edges of the mask may be tapered as shown in FIG. 7. As shown, the tapered mask of FIG. 7 includes a first portion 34 corresponding to signal 30 in FIG. 3 and a second portion 36 corresponding to signal 32 in FIG. 3. The tapered mask of FIG. 7 may next be applied to the replicated impulse response of FIG. 5 to generate the non-ambiguous impulse response. The non-ambiguous impulse response may then be applied to an FFT to generate the channel frequency response estimate.

Figure 8:
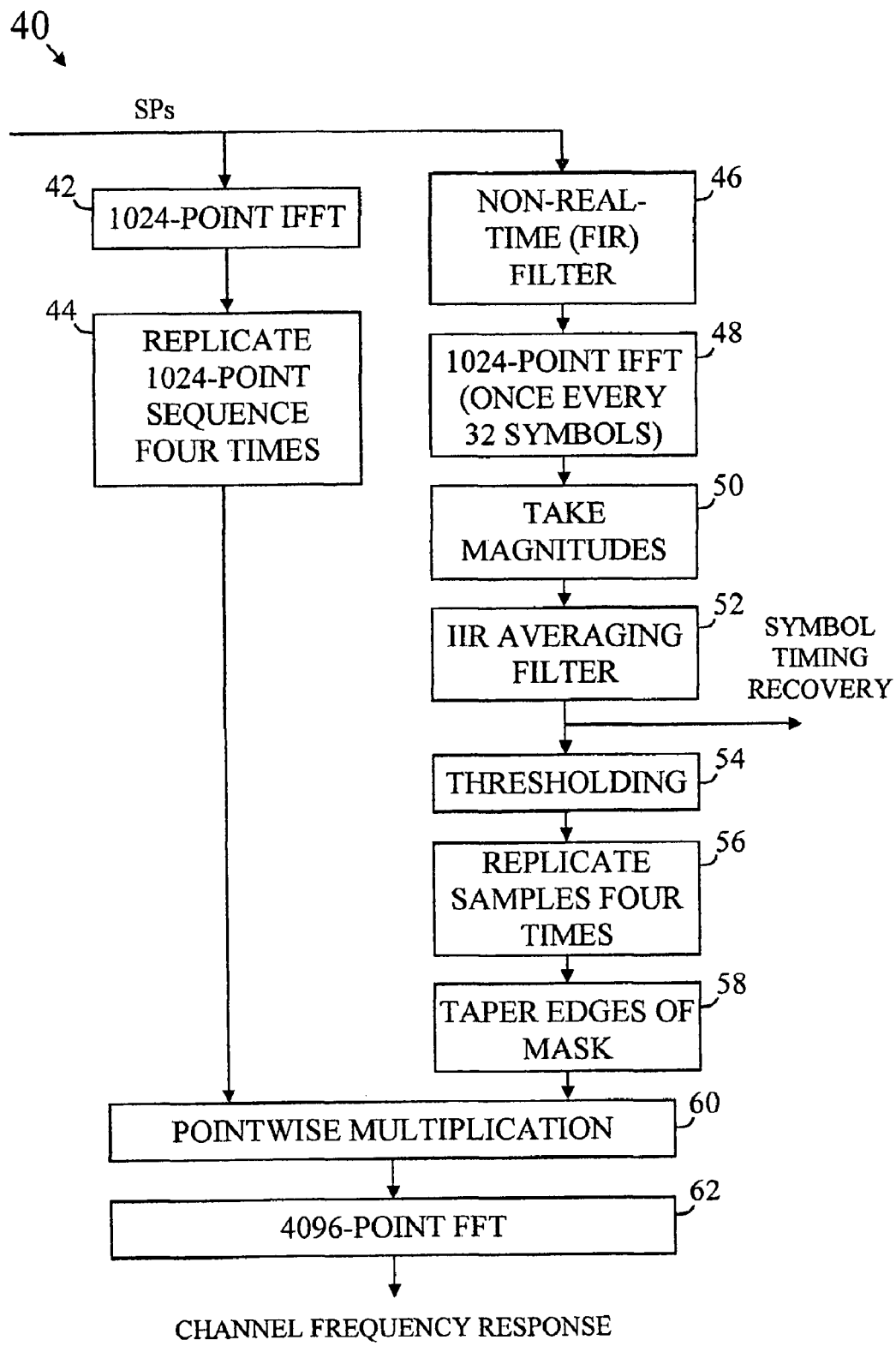
FIG. 8 is a flowchart illustrating an example method for estimating a channel response in a DVB-T system in accordance with an embodiment of the present invention.

FIG. 8 is a flowchart illustrating an example method 40 for estimating a channel response in a DVB-T system in accordance with an embodiment of the present invention. The method 40 represents one possible implementation of the method 20 of FIG. 2. As will be described in greater detail, the method 40 uses a FIR filter to operate upon the scattered pilots to develop the mask for use in ambiguity resolution. First, the scattered pilots of a single received OFDM symbol are processed in a 1024-point IFFT to generate an impulse response (block 42). As there are 568 scattered pilots within a symbol, a 1024-point IFFT may be used with zero padding or some other form of padding. In one possible alternative padding approach, the first and last scattered pilot may each be replicated 228 times before and after the 568 scattered pilots, respectively, to produce the 1024-point sequence. This technique may, however, generate an undesired DC component. To avoid the generation of a DC component, the replicated scattered pilots may be multiplied by a complex exponential to take the non-zero value to a frequency that will have minimal effect on the channel estimate. Other padding approaches may alternatively be used.

As described previously, the result of the IFFT includes ambiguity as any echo or path at a time greater than $T_u/12$ will be folded into the interval $0$-$T_u/12$ (as shown in FIG. 4). In other words, it is impossible to differentiate between at echo or path at time $\tau$ and an echo or path at time $(\tau+mT_u/12)$ within the impulse response output by the IFFT (where m is any positive or negative integer). After the impulse response has been generated, the resulting 1024-point sequence may be replicated four times to form an impulse response to which the mask may be applied (block 44). An example of this is shown in FIG. 5. In other embodiments, the resulting sequence may be replicated a different number of times.

Concurrently with the above-described processing, an impulse response of the channel may be worked out (in non-real-time) using a relatively long FIR filter (block 46). This filtering process may be performed without storing any data or pilots, thus requiring significantly less memory than previous techniques. A procedure for performing the filtration will be described shortly. Rather than achieving a new impulse response with each new symbol, this non-real time process produces a periodic "snap shot" of the channel impulse response every N symbols (e.g., every 32 symbols in one implementation). While not usable to perform channel equalization, these snap shots of the impulse response may be used to resolve the ambiguities in the impulse response generated previously. The snap shots may also be used for symbol timing recovery.

Figure 9:
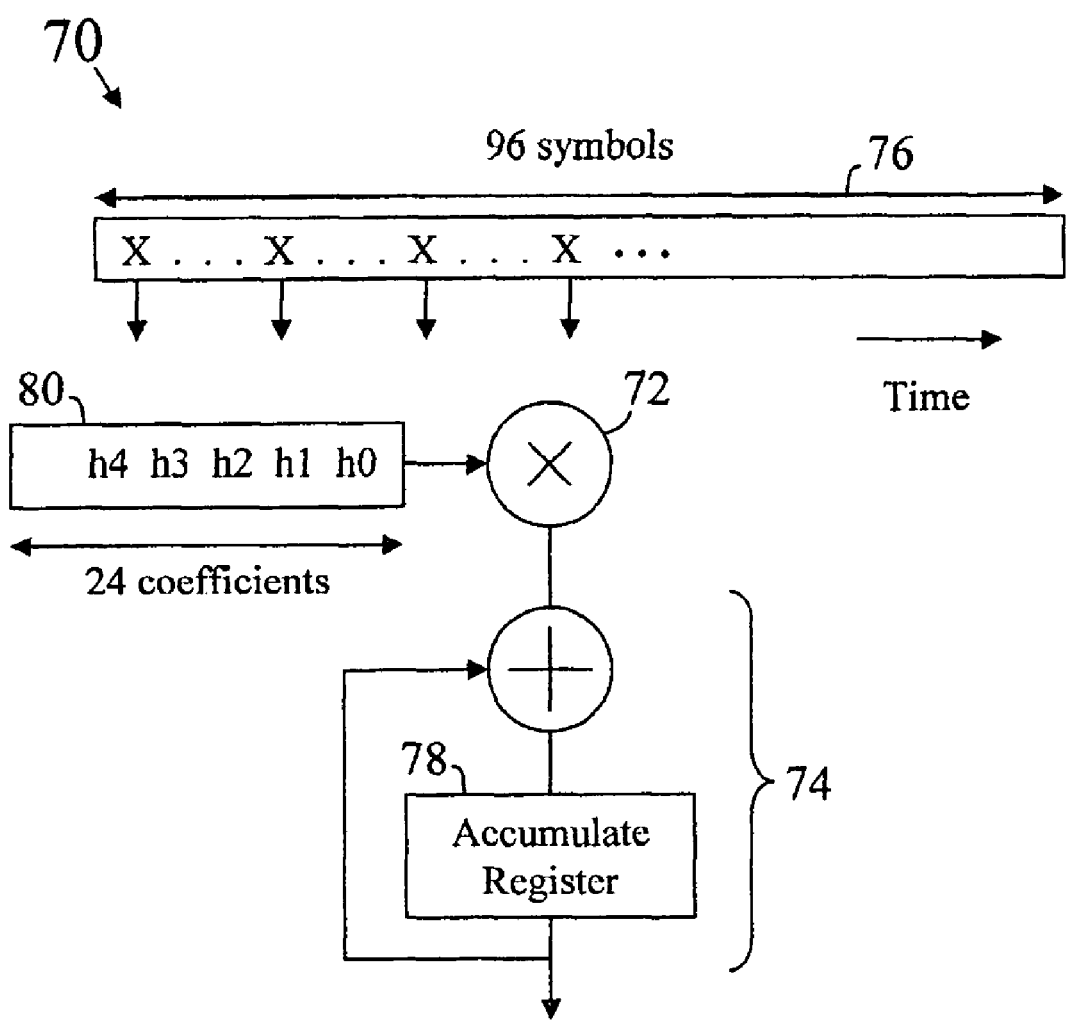
FIG. 9 is a block diagram illustrating an example filter arrangement that may be used in accordance with an embodiment of the present invention.

As described above, the snapshots of the channel impulse response may be a generated by first using a relatively long FIR filter. A long filter length is possible as no data or pilots are being stored during the process. In the discussion that follows, it will be assumed that a 24 tap filter is being used, although other filter sizes may be used in other implementations. Because the scattered pilots repeat every 4 OFDM symbols (see, e.g., FIG. 1), the filter is applied over 96 symbols (i.e., 4×24). FIG. 9 is a block diagram illustrating an example filter arrangement 70 that may be used in accordance with an embodiment of the present invention. As shown, the filter arrangement 70 uses a single multiplier-accumulator having a multiplier 72 and an accumulator 74. At the beginning of a 96-symbol period 76, a register 78 within the accumulator 74 is initialized. The scattered pilots are then multiplied and accumulated over time. At the end of the 96-symbol period 76, there is a single frequency response component of the time-filtered frequency response within the register 78. This operation is then repeated for every third frequency bin along the frequency axis. In fact, this is a 4-phase filter. In effect, there are four sets of 24-tap filter coefficients. At the end of the filtering process, a frequency response of the channel, sampled at frequencies $3/T_u$ apart, is achieved. The frequency response may then be applied to an IFFT to generate the snapshot of the impulse response of the channel. The IFFT generates a channel impulse response over a time interval of $T_u/3$ seconds.

In the 8K mode of DVB-T, there are 6817 useful carriers. Taking every third carrier results in 2272 carriers. It was determined that it is not necessary to work out the frequency response at all of these 2272 carrier positions. For example, in at least one embodiment of the invention, the time filter is only applied to the central 1024 scattered pilot positions (or some other subset) as these are the least likely to be corrupted by the edge effects of the filter. The multiplier-accumulator of FIG. 9 can be shared by all of these points since the data arrives at a rate of 9.14 mega samples per second (Msps) and scattered pilots arrive at $\frac{1}{12}$ of this rate. Therefore, only 0.75 million multiply-accumulate operations per second are required in this implementation. Data is complex, but the coefficients are real. Hence there are two operations, but a single real-valued multiplier-accumulator running at 1.5 MHz may be shared (i.e., 1.5 MOPs). A small memory may be provided to save the 1024 accumulator register values.

The technique described above generates a channel impulse response snap shot every 96 OFDM symbols. To achieve more frequent snapshots, multiple non-real-time filters may be run in parallel. For example, to generate a channel impulse response every 32 symbols, three non-real-time filters may be run in parallel, using the same coefficients in each filter. The second filter will be offset with respect to the first by 32 symbols and the third filter will be offset with respect to the second by 32 symbols. In one implementation, three multiplier-accumulators, like the one illustrated in FIG. 9, are used. In another implementation, a single high speed multiplier-accumulator may be used for all three filters (e.g., a 6 MOP real-valued, multiplier-accumulator in one embodiment). Using the above-described approach, the filter will generate a channel frequency response snap shot every 32 OFDM symbols.

Referring back to FIG. 8, after the channel frequency response snap shot is generated in the FIR filter, the response may be applied to a 1024-point IFFT to generate the channel impulse response snap shot (block 48). As the frequency response snap shot is generated every 32 symbols, the 1024-point IFFT is also computed every 32 symbols. After the 1024-point channel impulse response has been generated, the magnitudes of the impulse response samples are taken (block 50). As will be described in greater detail, the channel impulse response is being used here to generate a mask to resolve ambiguity and, therefore, only the magnitudes of the response are needed. Because the channel is time varying, the impulse response magnitudes will vary with time. Since it is only the envelope of the impulse response that is relevant, the response magnitudes may be run through a recursive (decaying) averager to recover the envelope (block 52). In at least one implementation, the averager performs the averaging as follows:

$$\text{Ave\_imp\_resp\_mag}(k) = 0.75 * \text{Ave\_imp\_resp\_mag}(k-1) + 0.25 * \text{imp\_resp\_mag}(k)$$

In addition to their use in generating the ambiguity resolving mask, the averaged impulse response magnitudes may also be used for symbol timing recovery.

In at least one embodiment, the IFFT may be thresholded to remove the noise floor (block 54). If there is only one impulse in the channel impulse response, the 1024-point IFFT may give up to a 30 dB gain. Because of this gain, noise thresholding can be done after the IFFT. Thus, if the input signal to noise ratio (SNR) of the IFFT is 15 dB, the output SNR could be up to 45 dB. In practice, the maximum gain may not be achieved, but thresholding may still provide significant benefit (although in some embodiments, no thresholding is used).

The channel frequency response estimates that are input to the 1024-point IFFT in the illustrated embodiment are actually spaced every 3/Tu. Therefore, the output of the 1024-point IFFT operation will cover a time duration of Tu/3 seconds. This is the same duration covered by the ambiguous impulse response of FIG. 5. However, the response of FIG. 5 has 4096 points covering the Tu/3 second duration (i.e., four times the resolution). To accommodate this difference, a 4096-point sequence may be generated from the IFFT output by replicating each sample therein four times to generate the mask (block 56). In an alternative approach, a 4096-point IFFT can be computed for each snapshot frequency response instead of a 1024-point IFFT. However, this approach is much more computationally intensive and the added resolution in the time domain will typically be unnecessary to resolve the ambiguities in the impulse response.

The mask generated in block 56 is a binary mask. After the binary mask has been generated, the edges of the mask may be tapered (block 58). As described previously, FIG. 7 illustrates an example of a tapered mask. After the mask has been tapered, the mask may be pointwise multiplied with the ambiguous impulse response generated in block 44 (see, e.g., FIG. 5). The pointwise multiplication should resolve the ambiguity within the ambiguous impulse response by eliminating the impulses that resulted from aliasing. A 4096-point FFT may then be computed for the resulting non-ambiguous impulse response to generate a channel frequency response that can then be used to perform equalization (block 62). This 4096-point FFT also does the 1:4 interpolation to give the channel frequency response at frequencies $3/T_u$ apart. In addition, the 4096-point FFT may also achieve noise filtering for the frequency response.

As described above, the mask generated in block 56 is a binary mask. As such, the mask has a relatively long response in the frequency domain. Because the method 40 of FIG. 8 involves pointwise multiplication in the time domain (block 60), which is essentially convolution in the frequency domain, the binary mask is not optimal for the present application. By tapering the mask edges in block 58, the length of the frequency response of the mask is reduced. Although the 4096-point FFT in block 62 gives a 4096-point frequency response, only 2272 values are really needed since there are only 6817 carriers per 8K symbol (i.e., 6817/3=2272). Therefore, there are 1824 carriers (i.e., 4096−2272=1824) to prevent wrap-around as a result of the convolution. This allows a fairly sharp mask to be used, but a binary mask may be too sharp. In one approach, the condition of the tapering is that the 4096-point FFT of the smallest mask with these tapered edges shall not have any significant values beyond the first 1824 values. Effectively, a polynomial multiplication modulo $(z^{4096}-1)$ is being performed, and as long as the sum of the degrees of the two polynomials does not exceed 4096, taking modulo will have no bearing on the actual multiplication. The taper can be worked out accordingly.

Figure 10:
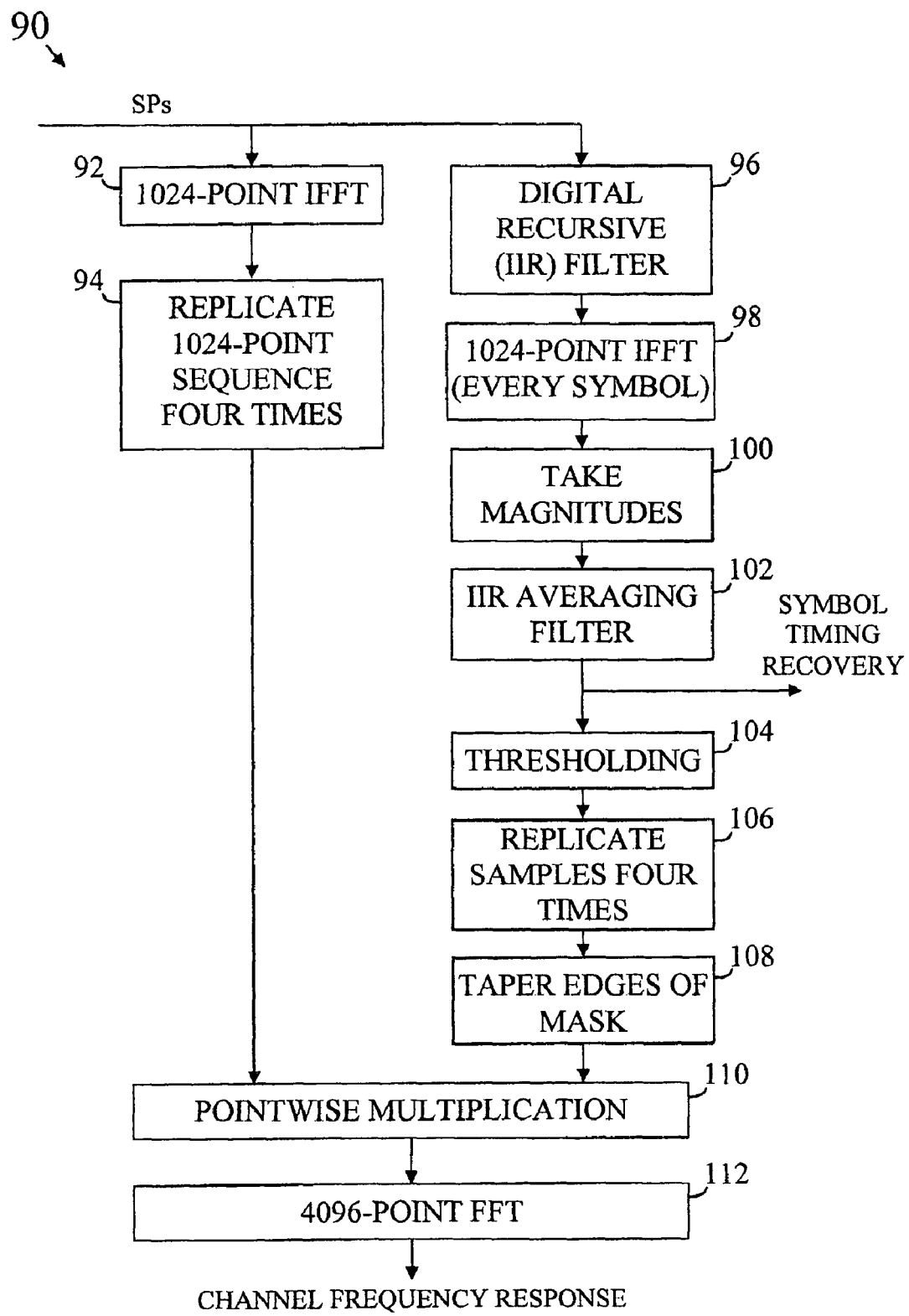
FIG. 10 is a flowchart illustrating another method for estimating a channel response in a DVB-T system in accordance with an embodiment of the present invention.

FIG. 10 is a flowchart illustrating an example method 90 for estimating a channel response in a DVB-T system in accordance with another embodiment of the present invention. The method 90 represents another possible implementation of the method 20 of FIG. 2. As will be described in greater detail, the method 90 uses an IIR filter to operate upon the scattered pilots to develop the mask for use in ambiguity resolution. Unlike the approach of FIG. 8, the present approach is capable of generating a mask in real time. That is, a new mask may be generated for each newly received symbol. As before, the scattered pilots of a single received OFDM symbol are first processed in a 1024-point IFFT to generate an impulse response that has ambiguity (block 92). After the impulse response has been generated, the resulting sequence is replicated four times (block 94).

Concurrently with this processing, the impulse response of the channel is worked out in real-time using an IIR (or digital recursive) filter (block 96). In at least one embodiment, a sixth order IIR filter is used, although other orders may be used in other embodiments. Each received symbol is passed through the IIR filter. The IIR filter could be visualized as many recursive filters, one for each scattered pilot location (i.e., one for every three carriers). Because only some of the scattered pilots are present in each symbol, zero values are substituted for carriers within a symbol that do not have a pilot. For each symbol received, the IIR filter outputs a filtered (and interpolated) channel frequency response sampled at frequency points 3/Tu apart. As in the previous embodiment, it is sufficient to process only the central 1024-points (or some other subset) of the frequency response. Although a new frequency response is worked out for each symbol received, the IIR filter does introduce latency (or delay) into the processing. The frequency response generated by the IIR filter is not usable to perform, for example, channel equalization, but it is usable for ambiguity resolution.

After the frequency response is output by the IIR filter, a 1024-point IFFT is computed to get the channel impulse response (block 98). In the previous embodiment, a channel impulse response snapshot was generated once every 32 input symbols and, therefore, an IFFT was performed once every 32 input symbols. In this embodiment, a channel impulse response is generated once every symbol and, therefore, an IFFT is performed once every symbol. The IFFT generates a sequence of complex numbers. The magnitudes of the complex numbers are next extracted (block 100). The magnitudes are then put through a decaying averager to recover the magnitude envelope (block 102). The same averaging equation described previously may be used. Other averaging techniques may alternatively be used. As before, the output of the averaging filter may be used to perform symbol timing recovery in addition to its use in creating a mask.

After averaging, thresholding may be used to remove the noise floor (block 104). The thresholded samples may then each be replicated four times to form a 4096 sample sequence, which is a binary mask (block 106). After the binary mask has been generated, the edges of the mask may be tapered, as discussed previously (block 108). The tapered mask may then be pointwise multiplied with the ambiguous impulse response generated in block 94 (block 110). The pointwise multiplication should resolve the ambiguity within the ambiguous impulse response by eliminating the impulses that resulted from aliasing. A 4096-point FFT is then computed for the resulting non-ambiguous impulse response to generate a channel frequency response that may then be used to perform equalization (block 112).

In at least one embodiment of the invention, a single fast FFT engine is shared between all FFT and IFFT operations in the system. In other embodiments, multiple FFT engines may be provided. In the description above, specific FFT and IFFT sizes are described. It should be appreciated that, in other embodiments, different FFT and IFFT sizes from those described above may be used. In addition, in the method 40 of FIG. 8, the filter generates a channel frequency response every 32 OFDM symbols. It should be appreciated that, in other embodiments, the FIR filter may generate a channel frequency response after a different number of symbols. For example, if four FIR filters are run in parallel, a channel frequency response may be generated every 24 symbols, and so on. Although described above as using FFTs and IFFTs, it should be appreciated that any discrete Fourier transform (DFT) or inverse discrete Fourier transform (IDFT) may be used in embodiments of the invention.

Figure 11:
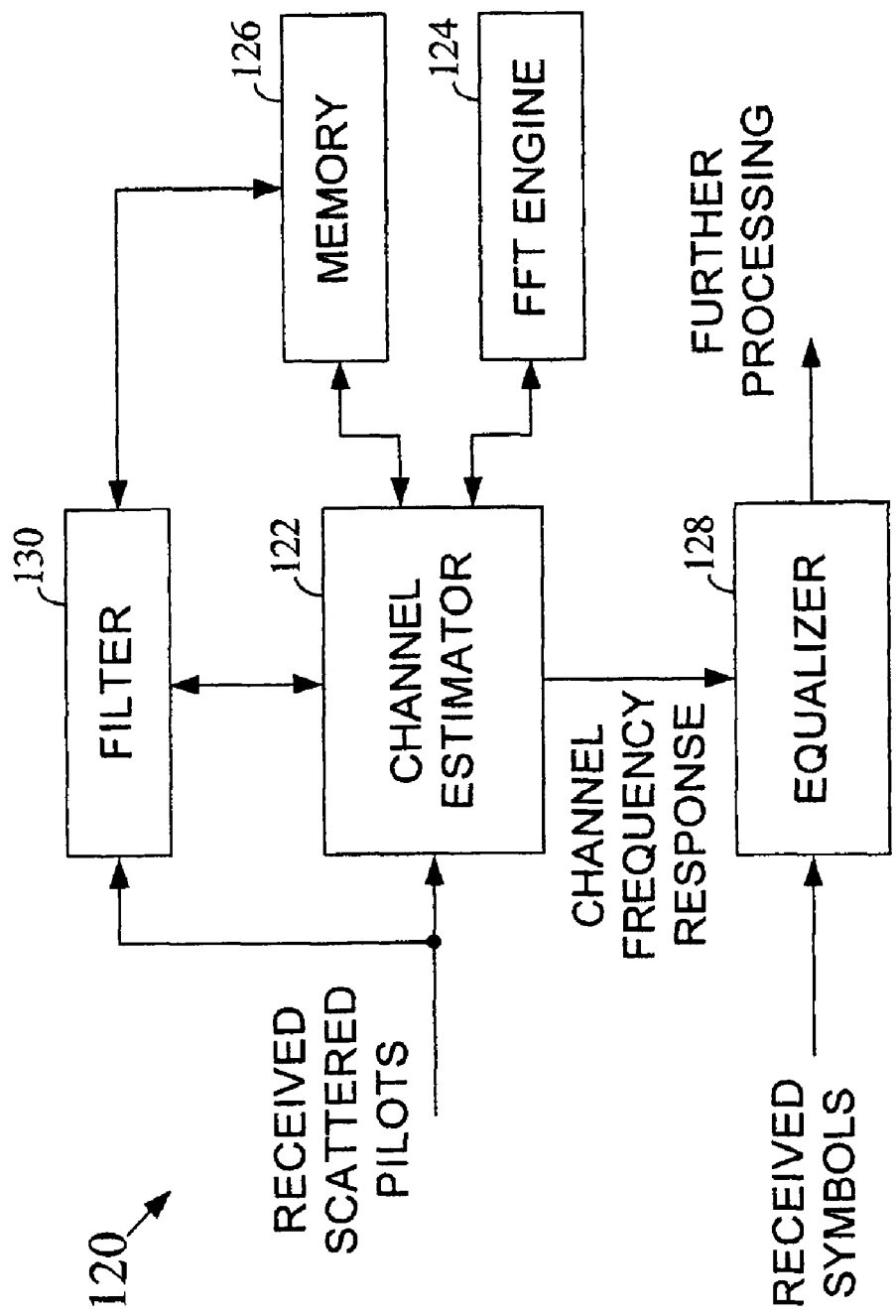
FIG. 11 is a block diagram illustrating signal processing functionality for use within a user device in a DVB-T system in accordance with an embodiment of the present invention.

FIG. 11 is a block diagram illustrating signal processing functionality 120 for use within a user device in a DVB-T system in accordance with an embodiment of the present invention. As illustrated, the signal processing functionality 120 includes: a channel estimator 122, an FFT engine 124, memory 126, an equalizer 128, and a filter 130. The channel estimator 122 is operative for developing an estimate of the wireless channel in the DVB-T system. The channel estimator 122 may be implemented within one or more digital processing devices such as, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The equalizer 128 is operative for providing equalization for symbols received by the user device from the wireless channel. The equalized symbols may then be delivered to other circuitry for further processing. The equalizer 128 uses the channel estimate generated by the channel estimator 122 to perform the equalization.

The channel estimator 122 may develop the estimate of the wireless channel using the techniques discussed previously (e.g., methods 20, 40, 90 of FIGS. 2, 8, and 10, respectively). The channel estimator 122 may use the FFT engine 124, the memory 126, and the filter 130 to carry out the channel estimation. The FFT engine 124 is operative for performing forward and inverse FFTs for the channel estimator 122. The FFT engine 124 may include one or more hardware FFT units to perform these services. Alternatively, the FFT engine 124 may be implemented in software within the same (or a different) digital processor as the channel estimator 122. The memory 126 is available for use by the channel estimator 122 for use in temporarily storing data and/or parameters during channel estimation procedures. The memory 126 may also be used by the filter 130 to store, for example, filter coefficients and/or other data or parameters. Any type of memory may be used. The filter 130 performs the filtering functions on the received scattered pilots during the generation of the ambiguity resolving mask. As described previously, the filter 130 may be a FIR filter or an IIR filter. The filter 130 may be implemented in hardware and/or software. In at least one embodiment, the filter 130 is implemented in software within the same digital processing device as the channel estimator 122.

In the methods described above, after a mask has been obtained, it is possible to analyse the mask to test whether there is echo aliasing. For example, in one approach, four copies of the mask can be generated, the original and ones shifted cyclically by Tu/12, 2Tu/12, and 3Tu/12. The four masks may then be overlaid on top of each other. If there are overlapping non-zero components among the overlaid masks, this implies that there is echo aliasing. Once echo aliasing has been detected, more traditional equalisation methods can be employed.

The design of an FIR or IIR filter in accordance with embodiments of the invention has to take into account the type of Doppler as well as the maximum Doppler frequency that is likely occur in the corresponding application. Most mobile channels are modelled using Rayleigh fading Doppler. The Doppler spectrum of this type of channel may will typically be plotted with a vertical axis is the power spectral density and a horizontal axis as the Doppler frequency. A maximum Doppler frequency $F_{Dmax}$ is typically defined which is proportional to the velocity and carrier frequency. In a typical implementation, scattered pilots are spaced $4(T_U + T_G)$ along the time axis. The result of this "sampling" along the time axis is to replicate the Doppler spectrum in time. The replicated Doppler spectra will overlap one another when $F_{Dmax}$ is large. This is referred to as aliasing. The FIR or IIR filter has to be designed such that its frequency response cuts out the aliased Doppler spectra. As the maximum Doppler frequency $F_{Dmax}$ gets larger and larger, it is necessary to reduce the bandwidth of the filter. The filter frequency response also has to be made sharper. This typically requires a longer FIR filter. In these circumstances, it may be advantageous to use an IIR filter, which can typically provide better cut-off characteristics than a FIR filter of the same order. In practice, the Doppler spectra and/or the maximum Doppler frequency may not be known in advance. Under these circumstances, a designer may decide to try out several filter frequency responses and select the one that gives the best performance in terms of signal to noise ratio (SNR), bit error rate (BER), or some other performance or quality metric.

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; satellite communicators; cameras having wireless capability; audio/video devices having wireless capability; network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   generating a first impulse response using scattered pilots within a single received orthogonal frequency division multiplexing (OFDM) symbol in a terrestrial digital video broadcasting (DVB-T) system, said first impulse response having ambiguity due to undersampling in the frequency domain;
   generating a mask to resolve ambiguity within said first impulse response, wherein generating a mask includes time filtering scattered pilots within received OFDM symbols to generate a channel frequency response from which said mask can be formed;

applying said mask to said first impulse response to generate a non-ambiguous impulse response; and computing a discrete Fourier transform of said non-ambiguous impulse response to generate a true channel frequency response.

2. The method of claim 1, wherein:

generating a first impulse response using scattered pilots within a single received OFDM symbol includes:

performing a discrete inverse Fourier transform of size N on said scattered pilots within said single received OFDM symbol to generate an N point sequence; and replicating said N point sequence to generate said first impulse response.

3. The method of claim 1, wherein:

time filtering scattered pilots within received OFDM symbols includes using a finite impulse response (FIR) filter to generate a snapshot of the channel frequency response every M received symbols, where M is a positive integer greater than 1.

4. The method of claim 3, wherein:

said FIR filter multiplies scattered pilots by filter coefficients and accumulates the result over time for frequency bins associated with scattered pilots.

5. The method of claim 1, wherein:

time filtering scattered pilots within received OFDM symbols includes filtering only a subset of the scattered pilots within received OFDM symbols.

6. The method of claim 1, wherein:

time filtering scattered pilots within received OFDM symbols includes using an infinite impulse response (IIR) filter to generate a channel frequency response for each received OFDM symbol.

7. The method of claim 1, wherein generating a mask further includes:

computing an inverse discrete Fourier transform on said channel frequency response from which said mask can be formed to generate a second impulse response;

extracting magnitudes of samples from said second impulse response; and averaging said magnitudes of said samples from said second impulse response.

8. The method of claim 7, wherein generating a mask further includes:

thresholding said averaged magnitudes of said samples from said second impulse response;

replicating each sample within said thresholded averaged magnitudes to generate a binary mask; and tapering the edges of said binary mask to generate a tapered mask.

9. The method of claim 8, wherein:

applying said mask to said first impulse response to generate said non-ambiguous impulse response includes pointwise multiplying said tapered mask and said first impulse response.

10. The method of claim 1, wherein:

time filtering scattered pilots within received OFDM symbols includes using multiple finite impulse response filters in parallel to generate a snapshot of the channel frequency response, each of said multiple finite impulse response filters using the same filter coefficients.

11. A wireless device for use in a terrestrial digital video broadcasting (DVB-T) system, comprising:

a channel estimator to generate a channel estimate for a wireless channel based on DVB-T scattered pilots within orthogonal frequency division multiplexing (OFDM) symbols received from the wireless channel;

a discrete Fourier transform engine to perform an inverse discrete Fourier transform on scattered pilots within a single received OFDM symbol to generate a first impulse response that includes ambiguity for said wireless channel; and a filter to time filter received DVB-T scattered pilots to generate a frequency response of said wireless channel;

wherein said channel estimator generates a mask using said frequency response output by said filter and uses said mask to resolve ambiguity within said first impulse response to generate a non-ambiguous impulse response.

12. The wireless device of claim 11, wherein:

said filter includes a finite impulse response (FIR) filter to generate a snapshot of the channel frequency response every M received OFDM symbols, where M is a positive integer greater than 1.

13. The wireless device of claim 11, wherein:

said filter includes an infinite impulse response (IIR) filter to generate a channel frequency response for each received OFDM symbol.

14. The wireless device of claim 11, wherein:

said channel estimator generates said mask by: causing said discrete Fourier transform engine to perform an inverse discrete Fourier transform on said frequency response output by said filter to generate a second impulse response, taking magnitudes of samples within said second impulse response, thresholding said magnitudes, and replicating said samples multiple times.

15. The wireless device of claim 11, wherein:

said channel estimator generates said non-ambiguous impulse response by first replicating said first impulse response multiple times in time to generate an expanded first impulse response and then pointwise multiplying said mask by said expanded first impulse response, wherein said channel estimator then causes said discrete Fourier transform engine to perform a discrete Fourier transform on the non-ambiguous impulse response to generate the channel estimate for the wireless channel.

16. A method comprising:

receiving a terrestrial digital video broadcasting (DVB-T) signal from a wireless channel, said DVB-T signal having a plurality of scattered pilots distributed in frequency bins thereof;

extracting a subset of scattered pilots from said DVB-T signal, said subset of scattered pilots having L elements, where L is an integer greater than 1;

converting said subset of scattered pilots from a frequency domain representation to a time domain representation, said time domain representation having L elements;

replicating said time domain representation multiple times to generate a sequence having NL elements, where N is an integer greater than 1;

pointwise multiplying said sequence having NL elements with a mask to generate a non-ambiguous sequence; and converting said non-ambiguous sequence from a time domain representation to a frequency domain representation to generate a channel frequency response of said wireless channel.

17. The method of claim 16, further comprising:

generating said mask before pointwise multiplying, wherein generating said mask includes:

time filtering scattered pilots within received DVB-T signals using a finite impulse response filter to generate a snapshot of a channel frequency response every M received signals, where M is a positive integer greater than 1;

converting said snapshot of said channel frequency response from a time domain representation to a frequency domain representation, said frequency domain representation of said snapshot having L samples;

taking magnitudes of said L samples;

thresholding said magnitudes of said L samples to generate thresholded samples;

replicating each sample of said thresholded samples N times to generate a mask having NL samples.

18. The method of claim 17, wherein:

generating said mask further includes tapering the edges of said mask having NL samples.

19. The method of claim 16, further comprising:

generating said mask before pointwise multiplying, wherein generating said mask includes:

time filtering scattered pilots within received DVB-T signals using a digital recursive filter to generate a channel frequency response for use in generating said mask;

converting said channel frequency response for use in generating said mask from a time domain representation to a frequency domain representation, said frequency domain representation having L samples;

taking magnitudes of said L samples;

thresholding said magnitudes of said L samples to generate thresholded samples; and replicating each sample of said thresholded samples N times to generate a mask having NL samples.

20. The method of claim 19, wherein:

time filtering scattered pilots using a digital recursive filter generates a channel frequency response for each newly received DVB-T signal.

* * * * *

UNITED STATES PATENT AND TRADEMARK OFFICE
CERTIFICATE OF CORRECTION

| | |
|---|---|
| PATENT NO. | : 7,970,068 B2 |
| APPLICATION NO. | : 11/986897 |
| DATED | : June 28, 2011 |
| INVENTOR(S) | : Bernard Arambepola et al. |

It is certified that error appears in the above-identified patent and that said Letters Patent is hereby corrected as shown below:

On the first page, in field (54), in "Title", in column 1, line 2, delete "DBV-T" and insert -- DVB-T --, therefor.

On the Face Page, in field (75), in Inventors, in column 1, line 2, delete "Borchamwood" and insert -- Borehamwood --, therefor.

In column 1, line 2, delete "Borchamwood" and insert -- Borehamwood --, therefor.

Signed and Sealed this
Eighteenth Day of October, 2011

David J. Kappos
*Director of the United States Patent and Trademark Office*

UNITED STATES PATENT AND TRADEMARK OFFICE
CERTIFICATE OF CORRECTION

PATENT NO.       : 7,970,068 B2                     Page 1 of 1
APPLICATION NO.  : 11/986897
DATED            : June 28, 2011
INVENTOR(S)      : Bernard Arambepola et al.

It is certified that error appears in the above-identified patent and that said Letters Patent is hereby corrected as shown below:

Title Page, Item (54) and at Column 1, line 2, in "Title" delete "DBV-T" and insert -- DVB-T --, therefor.

On the Title Page, in Item (75), in Inventors, second inventor city of residence, delete "Borchamwood" and insert -- Borehamwood --, therefor.

This certificate supersedes the Certificate of Correction issued October 18, 2011.

Signed and Sealed this
Twenty-second Day of November, 2011

David J. Kappos
*Director of the United States Patent and Trademark Office*